F. MARLOW.
Detaching Horses.
No. 61,748.
Patented Feb. 5, 1867.
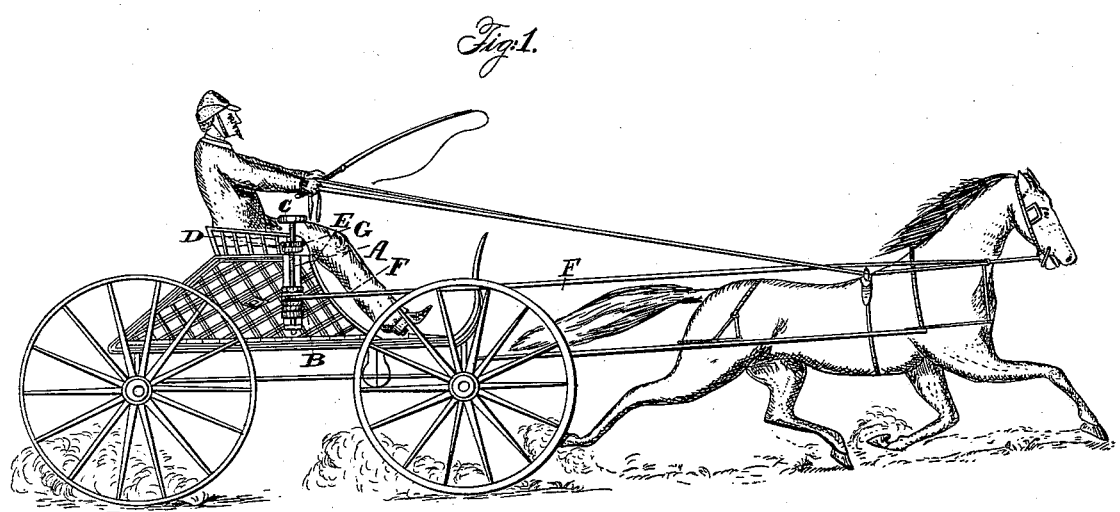
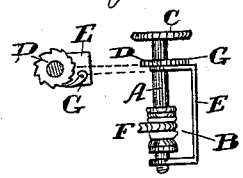
Witnesses
W. H. Burridge
I. Holmes
Inventor:
Francis Marlow

United States Patent Office.

FRANCIS MARLOW, OF CLEVELAND, OHIO.

Letters Patent No. 61,748, dated February 5, 1867.

IMPROVEMENT IN CARRIAGE-HORSE CONTROLLER.

The Schedule referred to in these Letters Patent and making part of the same.

TO ALL WHOM IT MAY CONCERN:

Be it known that I, FRANCIS MARLOW, of Cleveland, in the county of Cuyahoga, and State of Ohio, have invented certain new and useful Improvements in a Carriage-Horse Controller; and I do hereby declare that the following is a full and complete description of the construction and operation of the same, reference being had to the accompanying drawings, making a part of this specification, in which—

Figure 1 is a view of the carriage to which the controller is attached.

Figure 2 is a view of the controller detached.

Like letters of reference refer to like parts in the views.

This apparatus consists of a short upright shaft, A, fig. 2, on the lower end of which is a spool, B, and on the upper end a hand-wheel, C, and a ratchet-wheel, D. This shaft, with its wheels and spool, is placed in the arms of a stay, E, and in which it is journalled and operated by the hand-wheel referred to. The apparatus thus constructed is attached to the side of the carriage by the stay E, in the position as shown in fig. 1. To the spool is connected one end of a strong leather line, F, the other end of which is double and reaches forward to the horse's head, and is here buckled or otherwise fastened to the bits, one line on each side.

The advantages derived from the application of this controller are, viz: In driving an unruly or a hard-bitted horse, the driver must check and control the animal by personal strength, which is often a work of much exertion and labor. By the use of the controller the driver is relieved from much of this hard work. The line F referred to being connected to the bits and the spool, it will be evident that on turning the shaft by means of the hand-wheel, that the line is wound upon the spool, and as it winds, draws upon the bit equally upon each side of the mouth, and thereby curbing or checking the horse, hence relieving the strain upon the arms of the driver. A spring pawl, G, catches into the wheel D, and thereby holds the line in any degree of tension desired. Should the horse be running away, he can be successfully checked by drawing him strongly and steadily back with the controller, and with greater force than by the reins. It also takes the place of the bearing or check lines, and is much more convenient, as it is at all times immediately under the control of the driver, saving him the trouble of getting out of the carriage for the purpose of checking or unchecking the horse, so that the animal may drink, or for any other purpose. By this means, too, the horse can be checked up in any degree required with ease, and in much less time than by the use of the ordinary check line.

What I claim as my improvement, and desire to secure by Letters Patent, is—

The line F, spool B, and shaft A, in combination with the pawl and ratchet G D, attached to a carriage, as and for the purpose set forth.

FRANCIS MARLOW.

Witnesses:
W. H. BURRIDGE,
J. HOLMES.